May 15, 1956
M. H. L. SÉDILLE
2,745,611
JET PROPULSION AND BOUNDARY LAYER
CONTROL SYSTEM FOR AIRCRAFT
Original Filed May 2, 1947
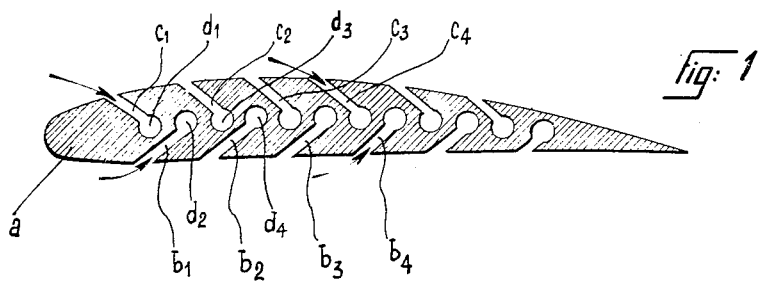
*fig: 1*
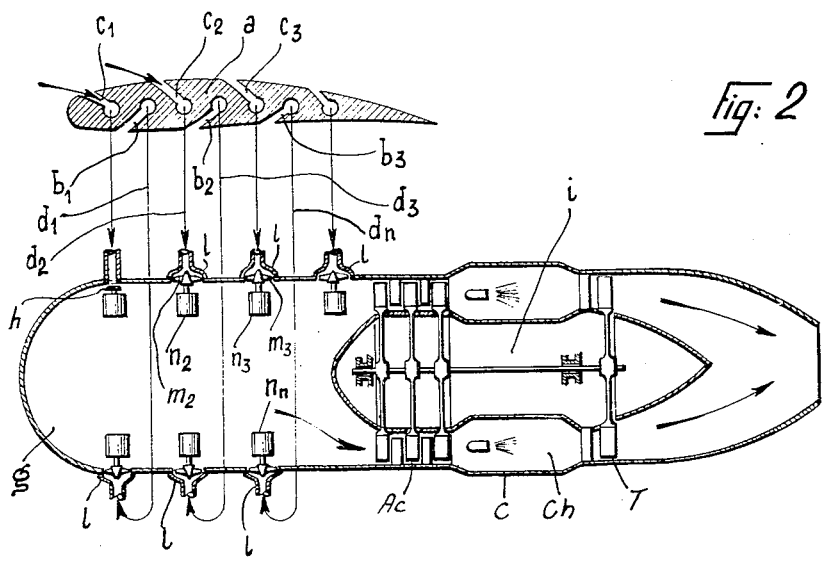
*fig: 2*
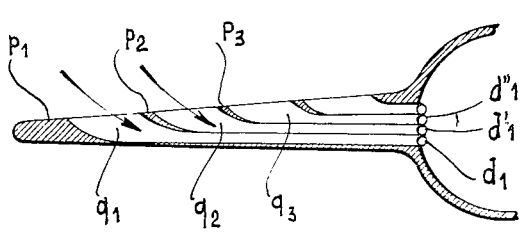
*fig: 3*
INVENTOR
Marcel H. L. Sédille
By Watson, Cole, Grindle & Watson
ATTORNEYS

United States Patent Office 2,745,611
Patented May 15, 1956

2,745,611

JET PROPULSION AND BOUNDARY LAYER CONTROL SYSTEM FOR AIRCRAFT

Marcel Henri Louis Sédille, Paris, France, assignor to Societe Rateau (Societe Anonyme), Paris, France, a company of France, and René Anxionnaz, Paris, France Continuation of application Serial No. 745,575, May 2, 1947. This application November 3, 1952, Serial No. 318,478

Claims priority, application France May 29, 1946

4 Claims. (Cl. 244—15)

This application is a continuation application of my co-pending application Ser. No. 745,575, filed May 2, 1947, now abandoned.

It is a well known fact that the suction of the boundary layer on aircraft wings allows of obtaining not only an increase in the lift but also a very substantial reduction in the drag of the wings by preventing the establishment of turbulent flow conditions, these advantages being obtained through the suitable arrangement of suction points providing a predetermined flow of air at predetermined points.

It has also been proposed to use, for feeding jet propulsion engines, the air thus removed from the boundary layer, as disclosed in my U. S. patent application Serial No. 650,564 filed on February 27, 1946, now U. S. Patent No. 2,604,277.

In order to obtain this effect with Reynolds' numbers in common use, it is necessary to provide a plurality of suction slots on the upper and lower surfaces of the wings. Now, when only a single suction slot is provided for the boundary layer, the main engines on the aircraft may be directly connected therewith.

The difficulties appear however in the case of a plurality of suction slots as each of the suction channels is submitted substantially to the pressure acting on the wing at the location of the corresponding slot, and as the pressure varies along the span of the wing, it also varies from one suction channel to the next.

On the other hand, the distribution of the pressure varies with the incidence of the wing and the amount of the air flow sucked in through each slot; it is therefore necessary to take such steps as may be necessary for adjusting the flow through each slot to the desired value in every case and for designing the suction of the principal engines or jet reaction engines under the best conditions possible with a minimum loss of energy.

In accordance with the present invention, I provide, in an aircraft having for its propulsion an engine to be fed with air: a plurality of slots arranged on the wing surfaces of the aircraft for the suction of the boundary layer, a collecting chamber which is closed, i. e. which is not directly connected to the atmosphere from which the engine feeding air is drawn off, a plurality of channels connecting the wing slots with said chamber, and compressors provided at the outlet of each channel into the said collecting chamber and discharging into the same, said compressors being adapted to raise the pressure of the air in the said chamber at least up to the value of the pressure in the channel wherein the pressure is the highest.

If desired, the engines can be of the type comprising an air compressor, a gas turbine for driving the same and a casing which contains both the air compressor and the gas turbine, said casing being prolonged beyond the suction side of said air compressor so as to form the said collecting chamber on which the said channels open out and which is connected with the suction side of said air compressor.

In order that the invention may be clearly understood, reference is made to the accompanying drawing which illustrates by way of example an embodiment of the invention and in which Fig. 1 shows diagrammatically a cross-section of an aircraft wing with its suction slots and connecting channels.

Fig. 2 is a diagrammatic cross-section of a wing similar to that of Fig. 1 showing its connections with a jet turbine engine.

Fig. 3 is a cross-section of a wing through a vertical plane perpendicular to the longitudinal axis of the aircraft and shows a modification in the arrangement of the suction slots for the boundary layer.

The suction of the boundary layer formed by air particles slowed down in the immediate proximity of the upper and lower surfaces of an aircraft wing may be performed as illustrated in Fig. 1. The wing illustrated diagrammatically by its outline $a$ includes a number of slots $b1$, $b2$, $b3$, $b4$ on its lower surface and $c1$, $c2$, $c3$, $c4$ on its upper surface. These slots inclined in the forward slanting direction of the relative wind are connected individually to channels $d1$, $d2$, $d3$, $d4$ and the like. Generally speaking, the thickness of the boundary layer and consequently the amount of the flow of air to be sucked in through each slot varies in accordance with numerous variables such as the speed of the aircraft, Reynolds' number, the angle of incidence of the wing, the shape of the outline, and so on; the pressure and amount of each flow of air will therefore vary during the operation of the aircraft.

I have illustrated diagrammatically by way of example in Fig. 2 an embodiment wherein the boundary layer is sucked in by a jet turbine engine, although the application of other types of propelling plant falls within the scope of my invention. This jet turbine engine comprises an air compressor $Ac$ driven by a gas turbine $T$ fed with combustion gases issuing from a combustion chamber $Ch$, these members being disposed inside a casing $C$ which extends forwardly of the air compressor $Ac$ to form a chamber $g$ sealed from atmosphere and rearwardly of the turbine $T$ to form a propulsive nozzle.

Each of the channels $d1$, $d2$, $d3$, $d4$ . . . is connected individually with a single collecting chamber $g$ and the inlet $l$ of each channel into said chamber is controlled by a suitable compressor $m2$, $m3$ . . . driven by individual motors $n2$, $n3$ . . . respectively. These motor controlled compressors may assume different speeds or operate on characteristic curves in a manner such that the pressure in the chamber $g$ may be equal to or higher than the highest pressure prevailing in the suction channels, for the boundary layer.

This latter condition is necessary if it is desired to prevent certain compressors from working as turbines as would occur if the pressure in one or more suction slots were higher than the pressure prevailing in the common chamber.

It is possible to replace the compressors at the ends of the suction channels of highest pressure, by mere flap valves such as $h$. In this case, the pressure obtaining in chamber $g$—which depends on the output of compressors $m$ and on the suction of the engine $i$—should be smaller than or at the utmost equal to that in the channel associated with a flap valve $h$ in which the pressure is the lowest, in order that every channel may deliver a certain amount of air into the collecting chamber $g$ which is closed, that is to say is not directly open to the atmosphere. In other words, the pressure obtaining in chamber $g$ will be comprised between the highest pressure of a channel associated with a compressor $m$ and the lowest pressure of a channel associated with a flap valve $h$.

As the pressure may also vary, starting from one end of the wing towards the longitudinal axis of the aircraft, it may be advantageous to subdivide the longitudinal slots into a plurality of separate elements feeding each a different channel as illustrated in Fig. 3. The slot portions $p1$, $p2$, $p3$ are then connected, through air removing channels $q1$, $q2$, $q3$, with connecting channels $d1$, $d'1$, $d''1$ conveying the sucked air into the collecting chamber $g$ and provided each at their inlet into said chamber with a compressor or flap valve as described.

What I claim is:

1. An aircraft comprising an air-consuming engine used for propelling said aircraft and having an air-intake side, wing surfaces in contact with atmospheric air and having thereon a plurality of spanwise suction slots for sucking up the boundary layer of atmospheric air said suction slots being staged at different levels between the leading edge and the trailing edge of said wing surfaces, an air-collecting chamber connected with said air-intake side and sealed from atmosphere, a plurality of channels connecting said slots with said chamber, and individual air compressors in said channels, one air compressor being disposed in each channel, said air compressors being adapted to discharge into said chamber.

2. Aircraft as recited in claim 1, further comprising a suction slot opening out in the vicinity of said leading edge, a channel connecting said suction slot with said air-collecting chamber, and a check valve in said channel for allowing air flow towards said chamber and preventing back flow therefrom.

3. Aircraft as recited in claim 1, comprising a jet turbine engine having a compressor adapted to suck up air from said air-collecting chamber, a combustion chamber at the discharge end of said compressor, and a turbine fed with motive gas issuing from said combustion chamber.

4. Aircraft as recited in claim 3, further comprising a casing disposed about said jet turbine engine and extending frontwardly beyond said compressor of said engine to form said air-collecting chamber.

References Cited in the file of this patent

UNITED STATES PATENTS

| | | |
|---|---|---|
| 1,580,577 | Baumann | Apr. 13, 1926 |
| 2,241,521 | Richard | May 13, 1941 |
| 2,431,592 | Stalker | Nov. 25, 1947 |
| 2,488,991 | Stalker | Nov. 22, 1949 |
| 2,514,513 | Price | July 11, 1950 |

FOREIGN PATENTS

| | | |
|---|---|---|
| 209,435 | Great Britain | Nov. 27, 1924 |
| 479,598 | Great Britain | Feb. 7, 1938 |
| 568,667 | Great Britain | Apr. 16, 1945 |
| 589,059 | Germany | Oct. 31, 1935 |
| 729,821 | France | May 2, 1932 |